Patented June 20, 1950

2,512,459

UNITED STATES PATENT OFFICE 2,512,459

DISPERSION OF PIGMENTS IN ETHYLENE POLYMERS

George Erving Hamilton, Parkersburg, W. Va., assignor to E. I. du Pont de Nemours & Company, Wilmington, Del., a corporation of Delaware No Drawing. Application February 23, 1949, Serial No. 78,013

9 Claims. (Cl. 260—28.5)

This invention relates to a process of dispersing pigments in ethylene polymers and to the compositions so produced and, more particularly, to a process of dispersing carbon blacks of small particle size and other finely-divided, difficultly dispersible pigments in tough, solid ethylene polymers.

A variety of techniques are well known for dispersing various types of pigments in polymeric matrices. For example, many pigments may be added directly to the polymer matrices by mechanical working to yield satisfactory colored polymers. Other techniques involve the use of pigment pastes employing water, organic liquids or surface-active dispersing agents. Also, it is well known to prepare concentrates of high proportions of pigment in a polymer matrix, followed by dilution of the concentrate by mixing with additional unpigmented polymer. More recently, the literature has described the incorporation of various pigments into ethylene polymers. The methods described have met with success in some instances depending upon the degree of dispersion required and the use intended for the particular pigmented polymer composition. Only recently have applications been found for pigmented ethylene polymers wherein the degree of dispersion of the pigment was found to be of the utmost importance. This has concentrated efforts towards preparing pigmented ethylene polymers containing pigments in very finely divided form and uniformly dispersed throughout the polymer matrix.

The ethylene polymers suitable for use in this invention are the normally solid homopolymers of ethylene described in Fawcett U. S. Patent 2,153,553. These polymers are tough solids at normal temperatures with a fusion point of about 212° F.–250° F., corresponding in composition substantially to $(CH_2)_x$, and show a crystalline structure by X-ray diffraction. Generally, they have molecular weights in excess of 6,000 measured according to the method described in U. S. Patent 2,153,553. Such polymers are denoted throughout the specification and claims as tough, solid ethylene polymers and they are to be distinguished sharply from the ethylene polymer waxes such as are obtained by pyrolyzing these tough, solid ethylene polymers. The waxes are likewise normally solid but they utterly lack the quality of toughness and, contrasted to the tough, solid ethylene polymers, they are not cold drawable.

An object of the present invention is to provide a pigmented ethylene polymer composition in which the pigment particles are very finely divided and uniformly dispersed and in which there are no large pigment agglomerates visible either to the naked eye or when a fused sample of said composition is viewed under a microscope at 100-power magnification. Another object is to provide a practical and economical method for dispersing finely-divided and difficultly dispersible pigments throughout ethylene polymers so as to obtain a high grade dispersion substantially free from pigment agglomerates without the use of liquid diluents such as water or organic liquids or highly polar dispersing agents. A more specific object is to provide an improved method of obtaining a pigmented ethylene polymer composition which is superior in its resistance to outdoor weathering and to the deteriorating effects of ultra-violet light as compared to those compositions which are unpigmented. Another object is to provide a method for obtaining improved transparency and less haze in ethylene polymer films pigmented in a variety of colors. Other objects will be apparent from the description of the invention given below.

The above objects are accomplished according to the present invention by mechanically working in the absence of liquid diluents and out of contact with the tough, solid ethylene polymer in the fused state, a finely-divided, difficultly dispersible pigment and a hydrocarbon wax having a melting point of 120° F.–200° F., the proportion of wax to pigment being at least 1:1, at a temperature above the melting point of the wax until the pigment is uniformly dispersed in the wax, and thereafter mixing the pigment dispersion in wax with the ethylene polymer in the fused state until a composition substantially free of pigment agglomerates is obtained.

The invention further comprises a composition essentially consisting of, by weight, 100 parts of a tough, solid ethylene polymer, 0.25–5 parts of carbon black having a particle size of less than 50 millimicrons, and 0.25–20 parts of a hydrocarbon wax having a melting point of 120° F.–200° F., the proportion of wax to pigment being at least 1:1 and the proportion of wax to polymer preferably not exceeding the maximum compatible proportion, the composition showing no pigment agglomerates when a thin section of the fused composition is viewed under a microscope with 100-power magnification. In a preferred form, a microcrystalline hydrocarbon wax having a melting point of 160° F.–200° F., is used in the proportion of 0.5–8 parts per 100 parts of ethylene polymer.

In carrying out the present invention, the tough, solid ethylene polymer may or may not be present during the first step of working the wax and pigment but it is an essential condition of the process that the wax and pigment be thoroughly mechanically worked while the wax is in the molten state, before the temperature is allowed to reach the fusion point of the ethylene polymer. Since these waxes generally have melting points well below the fusion point of the ethylene polymer, one quite practical and advantageous method of carrying out the invention is to add all three essential components at the start, providing an apparatus such as a Banbury mixer which will permit sufficient temperature control of the composition being worked upon, is used. In such an apparatus the temperature may be readily held at a point above the melting point of the wax and below the fusion point of the ethylene polymer until the wax and pigment are uniformly mixed, and then the temperature may be allowed to rise above the fusion point of the ethylene polymer while the Banbury continues in operation.

A second method is to prepare a wax-pigment-ethylene polymer concentrate under the conditions specified above and then dilute the concentrate with the desired amount of unpigmented additional polymer. In this concentrate the proportion of ethylene polymer will be less than in the final composition but it is necessary that a proportion of wax to pigment of at least 1:1 should be used. This dilution step may be carried out in any suitable equipment such as a Banbury mixer, an extrusion machine or the like, in one or more steps, provided the final mixing is carried out above the fusion temperature of the ethylene polymer.

A third method of carrying out the invention involves the preparation of a colored wax concentrate by thoroughly working the pigment into the molten wax in suitable equipment, such as on ink rolls or in a Banbury mixer. In this method of preparing the concentrate, the ratio of wax to pigment should be chosen so that, upon dilution of the concentrate with unpigmented ethylene polymer in a mixer, the final composition has the desired proportion of the three ingredients. After the pigment is uniformly dispersed in the wax, the mixing with the ethylene polymer may be carried out in a variety of apparatuses provided the temperature is above the fusion point of the ethylene polymer.

It is characteristic of the present invention, no matter which of the three above procedures is employed, that the pigment and wax must be thoroughly mechanically worked to obtain a uniform dispersion of the pigment in the wax but that, after this is accomplished, it is not necessary to work the dispersion with the ethylene polymer as the simplest mixing, if the polymer is in the fused state, will insure uniform distribution of the pigment in the final composition free of agglomerates.

The following examples illustrate specific embodiments of the invention. All proportions throughout the examples and specification are by weight unless otherwise noted.

*Example I*

100 parts of tough, solid ethylene polymer (18,000–20,000 molecular weight), 8.07 parts of "Be-Square" wax (170° F. to 175° F. melting point), and 1.09 parts of "Kosmos" BB carbon black were charged into a Banbury mixer maintained at full ram pressure. The temperature of the stock gradually rose because of the mechanical friction until the wax melted at about 170° F. in approximately two minutes. Mixing was continued until the ethylene polymer fused at a temperature of 220° F. ± 10° F. Mixing was continued for an additional eight minutes after the ethylene polymer fused; care was taken to keep the temperature of the stock below 310° F. by raising the ram and circulating cold water through the walls and rotors of the Banbury. The stock was then released from the Banbury and rolled into slabs, which in turn were cut to ⅜ of an inch molding powder in a Ball-and-Jewell cutter.

In this Banburying operation the temperature of the stock being worked rose continuously. However, the rise of temperature was sufficiently gradual so that there was a period of time between the temperature at which the wax melted and the higher temperature at which the ethylene polymer fused, long enough to insure the thorough working of the carbon black and melted wax before the ethylene polymer fused.

To determine the effectiveness of the dispersion of the pigment, the following test was used: a small piece of the molding powder was fused between two glass slides on a hot plate. The slide was then examined under a microscope at 100-magnification. A dispersion was rated "satisfactory" if the pigment particles were very fine and generally all dispersed and at most only some relatively small particles were visible under the microscope. A dispersion was rated "unsatisfactory" if the pigment particles were poorly dispersed with particles of widely different sizes visible, including large pigment agglomerates some even visible without magnification. While this test leaves a twilight zone between "satisfactory" and "unsatisfactory," the samples hereinafter mentioned as tested in this manner, clearly fell in one category or the other.

Subjected to this "dispersion" test, the molding powder prepared above was "satisfactory." To prepare a "control," the process was duplicated in all details except that the wax was eliminated entirely. The molding powder from this control was "unsatisfactory" when subjected to the "dispersion" test, the dispersion of the carbon black being obviously poor.

The molding powder of this example and that of the control were compression molded into test samples and tested as follows:

The two series of test samples were exposed to an accelerated weathering test in a weatherometer for 300 hours. The weatherometer was equipped to produce light and heat by means of a carbon-arc light source which was operated at a constant arc voltage of 130–145 volts and an arc amperage of 15–17 amps. after burning 15 minutes. A water spray was provided such that the samples were wet down once during every cycle. Samples were placed on a suitable jig and rotated approximately 12 inches from the light source. The cycle was such that the samples were in the light 18–20 minutes and in the shadow of the water spray device two minutes. No more than 20% of the samples of this example failed the low-temperature brittleness test (ASTM D–746–44T) at −49° F. On the other hand, between 80% and 100% of the control samples failed this same test.

*Example II*

100 parts of tough, solid ethylene polymer (18,000–20,000 molecular weight), 33.3 parts of "Be-Square" wax (170° F. to 175° F. melting point), and 16.7 parts of "Kosmos" BB carbon black were charged into a Banbury mixer maintained at full ram pressure. Steam was passed through the jackets of the Banbury until the temperature of the stock gradually rose in approximately two minutes to about 170° F. where the wax melted. Mixing was continued until the ethylene polymer fused at a temperature of 220° F. ± 10° F. Mixing was continued for an additional eight minutes after the ethylene polymer fused; care was taken to keep the temperature of the stock below 310° F. by raising the ram and circulating cold water through the walls and rotors of the Banbury. The stock was then released from the Banbury and rolled into slabs which in turn were cut to ⅛ of an inch molding powder in the Ball-and-Jewell cutter. As in Example I, the temperature rise of the stock was sufficiently gradual so that a period was provided for thorough working of the pigment and molten wax before the ethylene polymer fused.

10 parts of this molding powder concentrate were blended with 100 parts of ethylene polymer in a double cone blender for a period of 15 minutes at room temperature. This blended stock was then extruded in a three-inch extruder using a color mixing type screw at a stock temperature of about 320° F. The extruded ribbon was granulated in a cube cutter.

The pigment dispersion of this extruded composition was "satisfactory" under the "dispersion" test while a control composition manufactured by the same techniques but without the incorporation of wax was unsatisfactory. Further, the carbon black, wax, and ethylene polymer in the proportions of the blended stock, were introduced into the extruder with preliminary blending but without working the pigment and wax to get a uniform dispersion, and extruded at a stock temperature of about 320° F.; the extruded ribbon was granulated and under the "dispersion" test was found to be "unsatisfactory". The reason for this was the fact that the temperature of the stock rose so rapidly that the ethylene polymer fused before the pigment was uniformly dispersed in the molten wax and, as a result, satisfactory dispersion of the pigment was prevented.

*Example III*

100 parts of "Be-Square" wax (170° F. to 175° F. melting point), and 33.3 parts of Blue Lake BP-173-D were charged into a Banbury mixer. Steam was circulated through the walls of the Banbury until the wax melted at about 170° F. in approximately ten minutes. Mixing was continued for an additional period of ten minutes with cold water on the rotors and walls of the Banbury, at which time the colored wax concentrate was removed from the Banbury. This composition was granulated in a Ball-and-Jewell cutter.

20 parts of the wax concentrate and 100 parts of tough, solid ethylene polymer (18,000–20,000 molecular weight) were charged into a double cone blender and mixed for a period of 15 minutes at room temperature. This blended stock was extruded in a two-inch extruder using a color mixing type screw with the stock temperature at 280° F. The extruded ribbon was granulated in a cube cutter.

Under the "dispersion" test described in Example I the dispersion of the Blue Lake BP-173-D in the compositions of this example was "satisfactory" and the ribbon extruded from this composition was deep in color and free from haze. A control composition processed without the use of wax, had considerable haze caused by particles visible without magnification, did not have the richness of color, and did not have the covering power in thin sections possessed by films extruded from the above composition employing wax.

*Example IV*

Example I was repeated except that in place of the wax indicated there was used the same quantity of "Be-Square" wax (190° F.–195° F.) and in place of the "Kosmos" BB carbon black there was used the same quantity of "Micronex" Beads, another carbon black of fine particle size. The same compounding procedure was followed.

The pigment dispersion of this composition was "satisfactory" while a "control" composition omitting the wax was "unsatisfactory."

A further comparison was made substituting for the "Micronex" Beads the same quantity of a relatively coarse lamp black, the particle size of which was greater than 50 millimicrons and about three times that of the "Micronex" Beads. This composition showed a "satisfactory" dispersion whether or not wax was employed, demonstrating that the process of this invention operates more advantageously when applied to difficultly dispersible pigments such as very fine carbon blacks having a particle size less than about 50 millimicrons.

It will be understood that the above examples are merely illustrative and the present invention broadly comprises uniformly pigmenting tough, solid ethylene polymer by mechanically working in the absence of liquid diluents and out of contact with the ethylene polymer in the fused state, a finely-divided, difficultly dispersible pigment and a hydrocarbon wax having a melting point of 120° F.–200° F., the proportion of wax to pigment being at least 1:1, at a temperature above the melting point of the wax until the pigment is uniformly dispersed in the wax, and thereafter mixing the pigment dispersion in the wax with the ethylene polymer in the fused state.

The present invention primarily resides in the discovery that finely-divided pigments such as the carbon blacks and the like which the art has been unable to disperse satisfactorily in tough, solid ethylene polymer, may be dispersed in this polymer if the pigment is first dispersed in a molten hydrocarbon wax by mechanically working and then this dispersion is mixed with the ethylene polymer in the fused state. It has been found that these finely-divided pigments will not disperse satisfactorily directly in the fused ethylene polymer and, further, the pigment and wax must be mechanically worked, not merely mixed or blended, to get a uniform dispersion and this must be done before the ethylene polymer fuses. Surprisingly, it is not necessary to work mechanically the pigment in wax dispersion with the fused ethylene polymer as the simplest mixing will insure uniform dispersion of the pigment in the final composition.

The invention is chiefly directed toward the pigmentation of the tough, solid ethylene polymer hereinbefore mentioned. However, the general technique of this invention is also applicable to the dispersion of pigments in chlorinated solid ethylene polymer as described in Fawcett U. S. Patent 2,183,556 although specific conditions for optimum results are not necessarily the same when the chlorinated polymer is used. The state of subdivision of the ethylene polymer at the start of the process obviously is not critical since it is to be fused but, practically, the polymer should be in relatively small particles for convenience in handling. Particles of polymer obtained by cutting in a Ball-and-Jewell cutter or the fine particles in an uncompacted or "fluffy" form obtained by discharging the polymer into water as it is formed, are quite suitable.

While any pigment is readily dispersed in the ethylene polymer according to this invention, the greatest advantages of the invention are realized in dispersing finely-divided, difficulty dispersible pigments. Relatively coarse pigments may be dispersed satisfactorily by other well known methods without the use of the present invention.

Among the difficulty dispersible pigments for the dispersion of which this invention is particularly useful, are: "Monastral" Fast Green G (1945 Year Book of The American Association of Textile Chemists and Colorists); "Monastral" "Blue B" (Pigments Index of 1945); Cadmium Red No. 1124 (Pigments and Color Index of 1933); Blue Lake BP-173-D (also known as Ramapo Blue BP-173-D, National Paint Dictionary, J. R. Stewart, third edition); Red Toner RT-428-D (also known as Watchung Red, National Paint Dictionary, third edition) and the various carbon blacks. The carbon blacks of fine particle size are most advantageously dispersed according to this invention, particularly those having a particle size less than 50 millimicrons based on average diameter. Among these carbon blacks having a particle size of less than 50 millimicrons are: "Kosmos" BB; "Voltex"; "Monarch" 71; "Excello"; "Micronex" Beads; "Carbolac" No. 2 and "Supercarbovar."

The pigmented compositions of this invention may have widely different uses depending on the particular pigment and wax employed and the proportion of these two. For example, a composition containing a pigment such as one of the "Monastral" pigments may be best suited for the production of thin colored films, while compositions containing a carbon black have been found to have greatly improved resistance to ultraviolet light and the effects of such outdoor weathering over either unpigmented ethylene polymer or ethylene polymer compositions containing carbon black poorly dispersed therein. As used in the specification and claims, the term "carbon black" is used in its normal meaning to denote a gas black or fluffy black carbon pigment obtained by the combustion of natural gas and/or other hydrocarbons.

The amount of pigment for purposes of coloring the ethylene polymers according to the present invention will be in the range of 0.25–5 parts of pigment per hundred parts of the ethylene polymer. However, with the carbon black pigments of extremely fine particle size as below 15 millimicrons, it has been found that 0.5–2.5 parts of pigment per 100 parts of ethylene polymer are sufficient for protecting the ethylene polymer from the deteriorating effects of ultraviolet light, the higher the proportion of pigment within this range, the greater the protection. Any increase in the amount of carbon black beyond 2.5 parts does not appreciably improve the outdoor weathering characteristics of these compositions. By contrast, when it is desired to protect the ethylene polymer from light by the use of a relatively coarser carbon black (i. e., those having a particle size approaching but still less than 50 millimicrons), it is necessary to increase the amount of carbon black up to about 5 parts per 100 parts of ethylene polymer. As this concentration of carbon black is reached, the physical and electrical properties of the ethylene polymer composition show a tendency to drop off and, hence, a proportion of carbon black greater than about 5 parts per hundred parts of ethylene polymer generally would not be used for the most important electrical insulation applications for these compositions.

The waxes suitable for use in this invention are the hydrocarbon waxes; no other wax has been found that will give a satisfactory dispersion of the difficultly dispersible pigments in tough, solid ethylene polymer. These hydrocarbon waxes should have a melting point of 120° F.–200° F. and should be used in from 0.25–20 parts per hundred parts of the ethylene polymer. The melting point of the wax may exceed 200° F. provided it is at least 10° F.–15° F. below the fusion point of the ethylene polymer or provided the wax and pigment are to be worked to form a dispersion before the ethylene polymer is added. Usually, it is convenient to use a wax having a melting point not in excess of 200° F. in any event even though a higher melting point wax is permissible under the circumstances above.

The hydrocarbon waxes are a small group including only the microcrystalline hydrocarbon waxes, the paraffin waxes, and the ethylene polymer waxes. The ethylene polymer waxes as mentioned before, may be obtained by pyrolysis of the tough, solid, ethylene polymer but are sharply distinguished in lacking the quality of toughness and not being cold drawable. Because the ethylene polymer waxes have relatively high melt viscosities and the paraffin waxes generally are not compatible in amount greater than 5 parts per 100 parts of the ethylene polymer, the microcrystalline waxes having a melting point of 160° F.–200° F. are preferred, particularly for certain applications calling for a relatively high proportion of wax. Mixtures of two or more of these waxes are quite suitable such as a mixture of, by weight, 55% microcrystalline wax and 45% paraffin wax.

Although the paraffin waxes are generally not compatible with tough, solid ethylene polymer in a proportion greater than 5 parts to 100, these waxes may be used in greater proportion both because compatibility is not necessary in all applications and, also, because the compatibility of these waxes may be greatly increased by the presence of a third component, for example, a microcrystalline hydrocarbon wax or an ethylene polymer wax, or some different component. For many electrical applications the preferred compositions essentially consist of tough, solid ethylene polymer, a carbon black of particle size less than 50 millimicrons, and 0.5–8 parts of wax particularly a microcrystalline hydrocarbon wax, per 100 parts of the ethylene polymer. It should be noted, in general, where a composition must stand up under conditions of extreme cold, it is desirable to use the minimum amount of wax required for satisfactory pigment dispersion and thus avoid cold brittleness in so far as practical. On the other hand, if low temperatures are not to be encountered, increasing the proportion of wax has the advantage of making the composition more fluid at molding temperatures and thus more readily molded.

The advantage of the microcrystalline hydrocarbon waxes over the ethylene polymer waxes is primarily due to the fact that the pigment must be thoroughly worked into all of the wax in the molten state before any of the tough solid ethylene polymer fuses. The difference in melt viscosity between the ethylene polymer wax and the tough, solid ethylene polymer is not as great as that in the case of the microcrystalline hydrocarbon waxes or, for that matter, the paraffin waxes, the latter two having a much lower melt viscosity than that of the ethylene polymer waxes. This lower melt viscosity permits more time for the wax to melt and thoroughly coat each pigment particle before the solid ethylene polymer fuses.

Regardless of the proportion of wax desired in the final composition, an essential of this invention is the use of a proportion of wax to pigment of at least 1:1. This minimum ratio is critical whereas the maximum ratio is limited only by the maximum proportion of wax desired in the total composition. It is believed the reason for the critical minimum ratio of wax to pigment is that there must be sufficient wax to coat thoroughly each particle of pigment.

Among the preferred microcrystalline hydrocarbon waxes for use in this invention are the following, all commercially available: "Be-Square" waxes of various melting points, "Super Gem" wax, "Gem Yellow" wax and "Petrosense B."

Mixtures of two or more pigments may be used in the present invention and this is an advantage in some instances where it is desired to match a certain color, by blending and uniformly dispersing two pigments of different colors or shades.

The composition of this invention essentially consists of ethylene polymer, wax, and pigment but small amounts of other materials are not excluded. Such materials include anti-oxidants, stabilizers, lubricants, anti-static agents and the like but these will only be used in small amounts to improve certain properties of the composition other than the degree of pigment dispersion. For example, it is customary to add approximately 0.1%–5%, by weight of the ethylene polymer, of an anti-oxidant or heat stabilizer to protect the ethylene polymer when subjected to high temperatures either in the compounding cycles or in particular applications. But the use of liquid diluents, e. g., water and organic liquids, ordinarily used in the dispersing of pigments, is not contemplated in this invention. To add such diluents might adversely affect the degree of dispersion of the pigment and, in any event, such diluents are not necessary and their subsequent removal is an obvious economical disadvantage.

In carrying out this invention it is essential that the pigment and wax be subjected to a thorough mechanical working which is well known in the plastics art to involve a severe shearing or smearing action. Various apparatuses adapted for mechanical working of mixtures are known such as the Banbury mixer, color mixing type screw, ink rolls and other rolls, and the like. All of these are suitable for working the pigment and wax to get a uniform dispersion providing the ethylene polymer is not present. But if the ethylene polymer is present during this first step, the apparatus must be selected so that the requisite temperature control may be effected, that is, the temperature must not rise to the fusion point of the ethylene polymer and yet it must be above the melting point of the wax. The Banbury mixer is outstandingly adapted for this purpose as it readily permits the requisite temperature control.

The mixing of the wax pigment dispersion or the concentrate of wax, pigment, and ethylene polymer with ethylene polymer does not require any specific type of apparatus so long as the temperature of the stock may be raised above the fusion point of the ethylene polymer. Any of the aforementioned apparatuses for mechanical working may be used although simpler mixing apparatuses are quite satisfactory. Experimental work has shown that once the pigment is properly dispersed in the wax, simple mixing of the dispersion with the fused polymer will insure proper dispersion of the pigment in the final composition.

The temperature of the stock in the second step of the process is not critical providing it is above the fusion point of the ethylene polymer. Obviously, a temperature high enough to have any deleterious effect on the components of the composition should be avoided but, as the examples show, a temperature well over 300° F. involves no complications and such temperature is far above the fusion point of the polymer. As a very conservative limit, 310° F. is sufficiently high to be well above the fusion point of the ethylene polymer and yet is not so high as to run any risk from the deleterious effects of heat.

An advantage of the invention is that it provides a pigmented ethylene polymer composition which not only contains the pigment particles in relatively uniform sizes but also is free from visible pigment agglomerations, even under high magnification. The carbon black compositions of this invention exhibit far superior outdoor weathering properties and resistance to ultraviolet light than either the unpigmented or the poorly dispersed pigmented ethylene polymer compositions heretofore available. These carbon black compositions are highly valuable for the production of sheets, rods, tubes, and molding powders which may in turn be used for making electrical insulations for wires and cables as well as for other electrical components such as coils, transformers, resistors and capacitors; also, non-electrical uses where the ethylene polymer would be exposed to ultraviolet light and would tend to deteriorate rapidly, such as in garden hose.

Another advantage of the invention is that it provides a practical and economical method of preparing these compositions without the use of water, or organic liquids or highly polar, surface-active dispersing agents, the last traces of each of these being costly and cumbersome to remove. The process is one that does not involve unusual skill on the part of operators nor the use of apparatus not ordinarily available in the plastics art.

The compositions of this invention which contain finely-divided coloring pigments other than carbon black have the advantage of reduced haze and shade variations in extruded sheeting as contrasted to sheeting made from ethylene polymer compositions in which the pigment is unsatisfactorily dispersed, and reduced color specks and shade variations (due to large pigment agglomerations) in compression molded articles and extruded film, as contrasted to such articles made from compositions in which the pigment is poorly dispersed. Due to these advantages, difficulties in color matching from batch to batch are largely eliminated. For example, a thin film extruded from an ethylene polymer composition of this invention containing "Monastral" Fast Green G, is more transparent and more uniform in shade than a similar film made from an ethylene polymer composition in which the pigment is unsatisfactorily dispersed.

The ethylene polymer compositions containing the finely-divided pigments other than carbon black, may be used in the same applications as those mentioned above for the carbon black compositions, except that articles made from the former do not possess the improved stability toward light of the carbon black compositions. Thus, these compositions containing pigments other than carbon black may be fabricated by conventional methods into sheets, rods, tubes, and the like, and especially into films. Among the uses for these compositions may be mentioned food packaging, shower curtains, rain coats, coated fabrics, electrical insulations, plates, cups, tumblers, other household utensils, and the like.

As many apparently widely different embodiments of this invention may be made without departing from the spirit and scope thereof, it is to be understood that the invention is not limited to the specific embodiments thereof except as defined in the appended claims.

I claim:

1. Process of uniformly pigmenting tough, solid ethylene homopolymer which comprises mechanically working in the absence of liquid diluents and out of contact with said ethylene polymer in the fused state, a finely-divided, difficultly dispersible pigment and a hydrocarbon wax having a melting point of 120° F.-200° F., the proportion of wax to pigment being at least 1:1, at a temperature above the melting point of said wax until said pigment is uniformly dispersed in said wax, and thereafter mixing the pigment dispersion in wax with said ethylene polymer in the fused state until a composition substantially free of pigment agglomerates is obtained.

2. Process as set forth in claim 1 in which said pigment is carbon black having a particle size of less than 50 millimicrons.

3. Process as set forth in claim 1 in which said wax is a microcrystalline hydrocarbon wax having a melting point of 160° F.-200° F.

4. Process of uniformly pigmenting tough, solid ethylene homopolymer which comprises mechanically working in the absence of liquid diluents, a finely-divided, difficultly dispersible pigment, a hydrocarbon wax having a melting point of 120° F.-200° F., the proportion of wax to pigment being at least 1:1, and said ethylene polymer at a temperature above the melting point of said wax and below the fusion point of said ethylene polymer until said pigment is uniformly dispersed in said wax, and thereafter mixing said pigment, wax, and ethylene polymer at a temperature above the fusion point of said ethylene polymer until a composition substantially free of pigment agglomerates is obtained.

5. Process as set forth in claim 4 in which said pigment is carbon black having a particle size of less than 50 millimicrons.

6. Process as set forth in claim 4 in which said wax is a microcyrstalline hydrocarbon wax having a melting point of 160° F.-200° F.

7. Process of uniformly pigmenting tough, solid ethylene homopolymer which comprises mechanically working in the absence of other components, a finely-divided, difficultly dispersible pigment and a hydrocarbon wax having a melting point of 120° F.-200° F., the proportion of wax to pigment being at least 1:1, at a temperature above the melting point of said wax until said pigment is uniformly dispersed in said wax, and thereafter mixing the pigment dispersion in wax with said ethylene polymer in the fused state until a composition substantially free of pigment agglomerates is obtained.

8. Process as set forth in claim 7 in which said pigment is carbon black having a particle size of less than 50 millimicrons.

9. Process as set forth in claim 7 in which said wax is a microcrystalline hydrocarbon wax having a melting point of 160° F.-200° F.

GEORGE ERVING HAMILTON.

REFERENCES CITED

The following references are of record in the file of this patent:

UNITED STATES PATENTS

| Number | Name | Date |
|---|---|---|
| 2,448,799 | Happoldt et al. | Sept. 7, 1948 |